(12) United States Patent
Gong et al.

(10) Patent No.: US 11,989,649 B2
(45) Date of Patent: May 21, 2024

(54) PAIRWISE RANKING USING NEURAL NETWORKS

(71) Applicant: DeepMind Technologies Limited, London (GB)

(72) Inventors: Xiaohong Gong, Sunnyvale, CA (US); Arturo Bajuelos Castillo, Miami, FL (US); Sanjeev Jagannatha Rao, Sunnyvale, CA (US); Xueliang Lu, Fremont, CA (US); Amogh S. Asgekar, Palo Alto, CA (US); Anton Alexandrov, San Francisco, CA (US); Carsten Miklos Steinebach, El Cerrito, CA (US)

(73) Assignee: DeepMind Technologies Limited, London (GB)

( * ) Notice: Subject to any disclaimer, the term of this patent is extended or adjusted under 35 U.S.C. 154(b) by 643 days.

(21) Appl. No.: 16/951,362

(22) Filed: Nov. 18, 2020

(65) Prior Publication Data
US 2021/0406680 A1  Dec. 30, 2021

Related U.S. Application Data

(60) Provisional application No. 63/045,002, filed on Jun. 26, 2020.

(51) Int. Cl.
*G06N 3/08* (2023.01)
*G06N 3/045* (2023.01)
(Continued)

(52) U.S. Cl.
CPC ............... *G06N 3/08* (2013.01); *G06N 3/045* (2023.01); *G06Q 30/0641* (2013.01); *G06F 3/04842* (2013.01)

(58) Field of Classification Search
CPC ...... G06N 3/08; G06N 3/045; G06Q 30/0641; G06F 3/04842
See application file for complete search history.

(56) References Cited

U.S. PATENT DOCUMENTS 7,689,520 B2     3/2010  Burges et al.
8,010,535 B2 *   8/2011  Taylor .................. G06F 16/217
                                                 706/12
(Continued)

OTHER PUBLICATIONS

Santos, C. N. D., Xiang, B., & Zhou, B. (2015). Classifying relations by ranking with convolutional neural networks. arXiv preprint arXiv:1504.06580. (Year: 2015).*

(Continued)

*Primary Examiner* — Ryan C Vaughn
*Assistant Examiner* — Lokesha G Patel
(74) *Attorney, Agent, or Firm* — Fish & Richardson P.C.

(57) ABSTRACT

Methods, systems, and apparatus, including computer programs encoded on computer storage media, for training a neural network used to generate a ranking score for a network input. One of the methods includes generating training data and training the neural network on the training data. The training data includes a plurality of training pairs. The generating comprising: obtaining data indicating that a plurality of training network inputs were displayed in a user interface according to a presentation order, obtaining data indicating that a first training network input of the plurality of training network inputs has a positive label, determining that a second training network input of the plurality of training network inputs (i) has a negative label and (ii) is higher than the first training network input in the presentation order, and generating a training pair that includes the first training network input and the second training network input.

20 Claims, 7 Drawing Sheets

(51) Int. Cl.
*G06Q 30/0601* (2023.01)
*G06F 3/04842* (2022.01)

(56) References Cited

U.S. PATENT DOCUMENTS

| | | |
|---|---|---|
| 10,268,646 B2 | 4/2019 | Jaech et al. |
| 10,878,550 B2 | 12/2020 | Shen et al. |
| 2007/0239632 A1* | 10/2007 | Burges .................. G06N 20/00 706/15 |
| 2018/0276734 A1 | 9/2018 | Wu et al. |
| 2019/0251446 A1 | 8/2019 | Fang et al. |

OTHER PUBLICATIONS

Cao et al., "Learning to Rank: From Pairwise Approach to Listwise Approach," ICML, 2007, 9 pages.

wikipedia.org [online], "Inverse probability weighting," last edited on Dec. 14, 2020, retrieved on Mar. 17, 2021, retrieved from URL<https://en.wikipedia.org/wiki/Inverse_probability_weighting>, 4 pages.

wikipedia.org [online], "Kendall rank correlation coefficient," last edited on Jan. 26, 2021, retrieved on Mar. 17, 2021, retrieved from URL<https://en.wikipedia.org/wiki/Kendall_rank_correlation_coefficient>, 6 pages.

\* cited by examiner

PAIRWISE RANKING USING NEURAL NETWORKS

CROSS-REFERENCE TO RELATED APPLICATION

This application claims priority to U.S. Provisional Application No. 63/045,002, filed on Jun. 26, 2020. The disclosure of the prior application is considered part of and is incorporated by reference in the disclosure of this application.

BACKGROUND

This specification relates to machine learning models, including neural networks.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of network parameters.

SUMMARY

This specification describes a ranking system implemented as one or more computer programs on one or more computers in one or more locations that trains neural networks using pairwise ranking, and can generate training pairs of network inputs based on a presentation order for elements represented by the network inputs while the elements are displayed in a user interface for a user device. The ranking system can train a neural network on training data representing individual network inputs and the generated training pairs by updating network parameter values from both pointwise losses from each individual input and pairwise losses from each training pair.

Neural networks, especially neural networks configured to generate ranking scores for ranking a plurality of elements represented by network inputs, can be trained using both pointwise and pairwise losses calculated from network-predicted output probabilities of ranking positions for training network inputs. A ranking system can augment a training pipeline for an existing neural network to update network parameter values for the network using both pointwise losses and pairwise losses of individual network inputs and pairs of network inputs. The ranking system can augment the training pipeline even when the original training pipeline for the neural network included only updating network parameter values using pointwise losses.

A network input is a representation of an individual element that is ranked among a plurality of other elements. For example, a network input can represent a software application available on an online software application store. The network input includes one or more features associated with the element, e.g., the software application. Features for a software application can include: user engagement of the application, install rate, number of times clicked/viewed, number of times accessed by a user after installation, or application performance quality, to name a few.

Once trained, the neural network can receive a plurality of network inputs and generate a respective ranking score for each network input. In particular, the neural network can output predicted probabilities for the network inputs corresponding to which position in a ranking order the neural network predicts each network input should be in, relative to one another. From the probabilities, a ranking score for each network input can be generated, and the ranking scores can be used to rank (or re-rank) the network inputs. Ordering the network inputs by ranking score can be performed by the ranking system or another system communicatively coupled to the ranking system.

In some implementations, the ranking system receives network inputs selected from a trained candidate generation model trained to obtain the plurality of network inputs from a collection of network inputs based on a respective predicted relevance of each network input in the plurality of network inputs. For example, from a collection of network inputs representing thousands of software applications available for download on a software application store, the candidate generation model can obtain a smaller plurality, e.g., 200 inputs, and provide them according to a ranked order, to the ranking system. The ranking system, in turn, can generate ranking scores for re-ranking the applications according to some criteria, e.g., by predicted user relevance.

While this specification generally describes ranking and re-ranking software applications, the described techniques can be used to rank any kind of digital content, e.g., search results identifying Internet resources, e-books, digital videos, and so on.

The subject matter described in this specification can be implemented in particular embodiments so as to realize one or more of the following advantages. The technologies described in this specification allow for improving the training for a neural network, using both pointwise and cross-entropy losses computed for individual network inputs and pairs of network inputs, respectively.

If the neural network is being trained to perform ranking, then the addition of training pairs can specifically improve the accuracy of the network once trained, by introducing new information in the relationships between different inputs, e.g., by mitigating rank invariance problems, especially in networks that generate ranking scores having a low variance distribution.

The architecture of the neural network does not have to be modified, allowing for flexible implementation of the techniques described in this specification to existing training pipelines. Further, the techniques described can be flexibly implemented for different neural network architectures, without affecting how the neural network processes inputs at inference.

Higher quality training pairs of training network inputs can be generated according to the relative positions of each input in the pair while displayed in a user interface. A first training network input can be assigned a positive label and paired with another training network input that has been assigned a negative label and that appears before the first training network input in the presentation order. The relationship between the inputs in a training pair can capture additional information about the inputs relative to one another, e.g., capture information about the preference a user has for one input over another while elements represented by the inputs are both displayed at the same time in the user interface.

Training network inputs to the neural network can be further improved by generating a bias for each input according to a respective position in the presentation order, thereby preventing positively labeled inputs of the first few positions in the order from overwhelming positively labeled inputs later in the same order. In addition, by pairing negatively labeled and positively labeled inputs together, training on these generated pairs can reduce the number of inversions, i.e., incorrect rankings, by the network once it is trained.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

It is a technical problem to reduce computation cost and increase accuracy when ranking a plurality of items in one or more collections in response to a user request, e.g., using a neural network, especially when the one or more collections include a large amount of items received as input by the neural network. For example, a search engine can be required to effectively rank millions of search results in response to a search query. As another example, an app store can be required to rank millions of mobile software applications in response to a search query.

This specification describes techniques to address this problem. More specifically, this specification describes a ranking system configured to train a neural network to generate ranking scores for network inputs that can be used to effectively rank or re-rank the network inputs.

Many conventional ranking systems currently make recommendations of elements by training a neural network using a pointwise loss. The pointwise loss is defined on the basis of a single object, i.e., a measure of a difference between a prediction for the single object and a benchmark value that should have been predicted for the single object. As a more concrete example, a pointwise loss in a ranking process can be a sum of the squared differences between, for each item in a collection, a predicted position of the item in the ranking and the ground-truth position of the item in the ranking. Pointwise losses are easy to train and can be scaled to fit a large data set. However, these conventional systems can suffer from rank invariance problems. Rank invariance refers to cases where the ranking score distributions of all elements are low in variance (i.e., quite similar to each other). In these cases, these conventional systems thus cannot provide an accurate presentation order of a plurality of elements (i.e., an order that accurately matches the order that the elements would be ranked by some specified metric) for different audiences using ranking scores for the elements generated from models trained using the pointwise loss because pointwise losses do not consider the relative positions of elements in a ranking and therefore cannot effectively handle low variance ranking score distributions.

To solve this problem, the specification describes a ranking system that considers relative values of ranking scores of all elements by training the model using a pairwise loss that is calculated between two elements and respective pointwise losses for one or both of the two elements. More specifically, the ranking system can generate training pairs from a plurality of neural network inputs, and train the neural network based on both the pointwise loss from each individual input and the pairwise loss from each training pair. The plurality of neural network inputs can be a plurality of elements presented in an order during a presentation, with each network input having different features.

Figure 1:
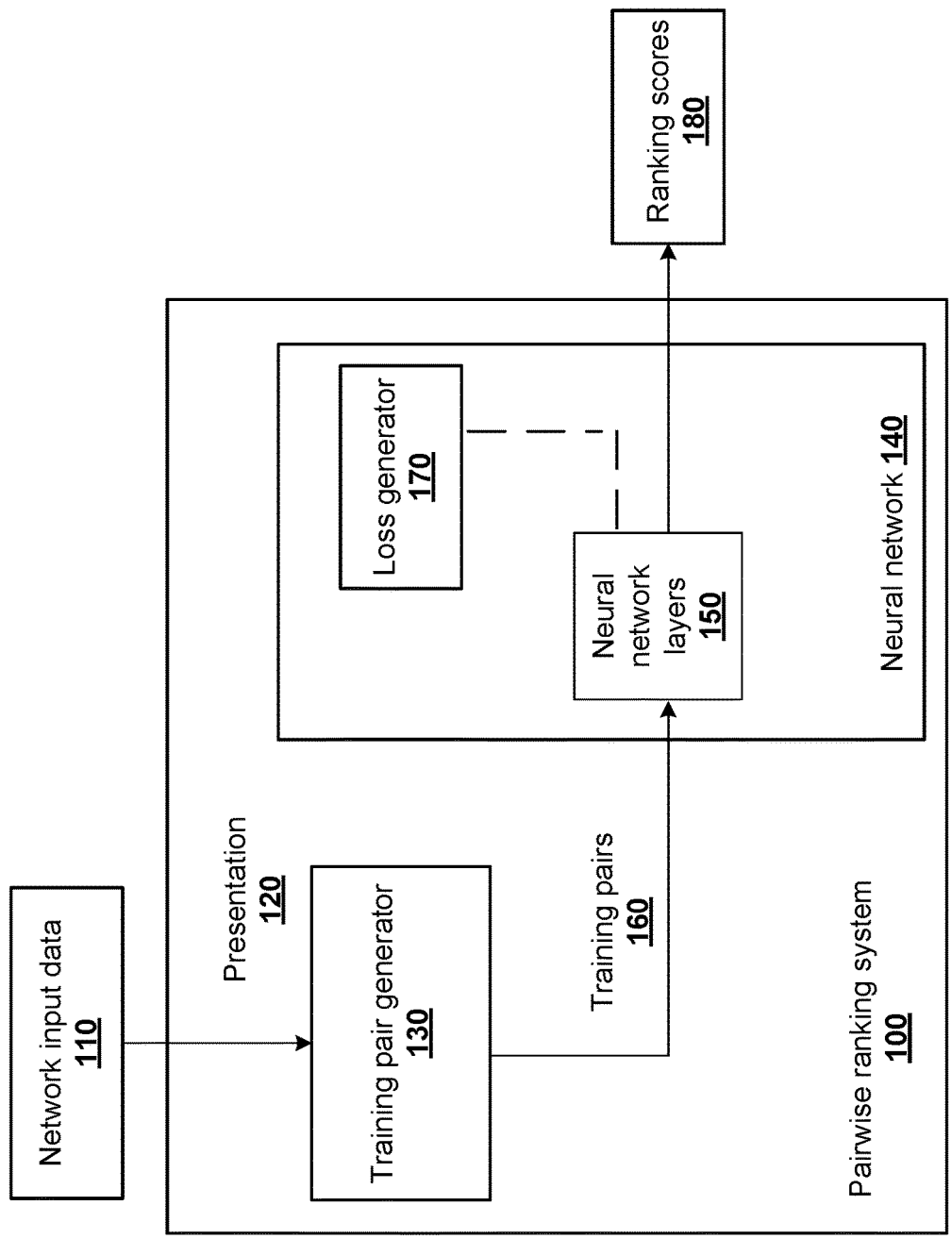
FIG. 1 shows an example pairwise ranking system using a neural network.

In particular, FIG. 1 shows an example pairwise ranking system 100 that uses a neural network 140. The pairwise ranking system 100 is an example of a system implemented as computer programs on one or more computers in one or more locations, in which the systems, components, and techniques described below can be implemented.

The pairwise ranking system 100 includes a neural network 140 that receives as input training pairs 160 with corresponding features and can be trained on these features to output predicted ranking scores 180 used for ranking or re-ranking the order of presented elements. The neural network 140 includes a plurality of neural network layers 150. Each layer of the network layers 150 includes a plurality of neural network parameters that define the network layer. The system 100 can update the network parameters when training the neural network 140. In some implementations, the ranking system 100 or the neural network 140 can further include a loss generator 170 configured to determine a total loss being minimized when training the network.

To train the neural network 140, the system 100 receives as input network input data 110 that includes data representing a plurality of network inputs, i.e., a plurality of elements, listed in one or more presentations 120 according to one or more orders. More specifically, each presentation 120 includes a list of elements to be presented in one or more user interfaces according to an order. The elements can be online documents, virtual merchandise, or combinations of the both. The online documents can be e-books, videos, and search results, and the virtual merchandise can be software applications. As a particular example, the software applications can be presented for users to download from servers or web stores, and install on one or more user devices.

The pairwise ranking system 100 includes a training pair generator 130 to generate training pairs based on each presentation 120 from the network input data 110. For each pair of elements in the presentation order, the generator 130 can add labels to each element of a pair that reflect the metrics that the model is being trained to optimize for. For example, the generator 130 could add a label representing whether an element is chosen by the user when presented in a presentation order.

The system 100 provides training pairs 160 output by the training pair generator 130 for training the neural network.

The training pairs 160 include a plurality of pairs of network inputs, with each pair including two different network inputs. Each network input in the pair has a plurality of features that represent the corresponding element, i.e., element features, and optionally features of the user to whom the presentation was presented, i.e., user features. In some implementations, the plurality of features can also include data representing element position features (e.g., initial/historical position ranked for an element of the collection) and device features (e.g., device type representing a device receiving and displaying the ranking results, for example, type representing a smartphone, a tablet or a personal computer).

Figure 2:
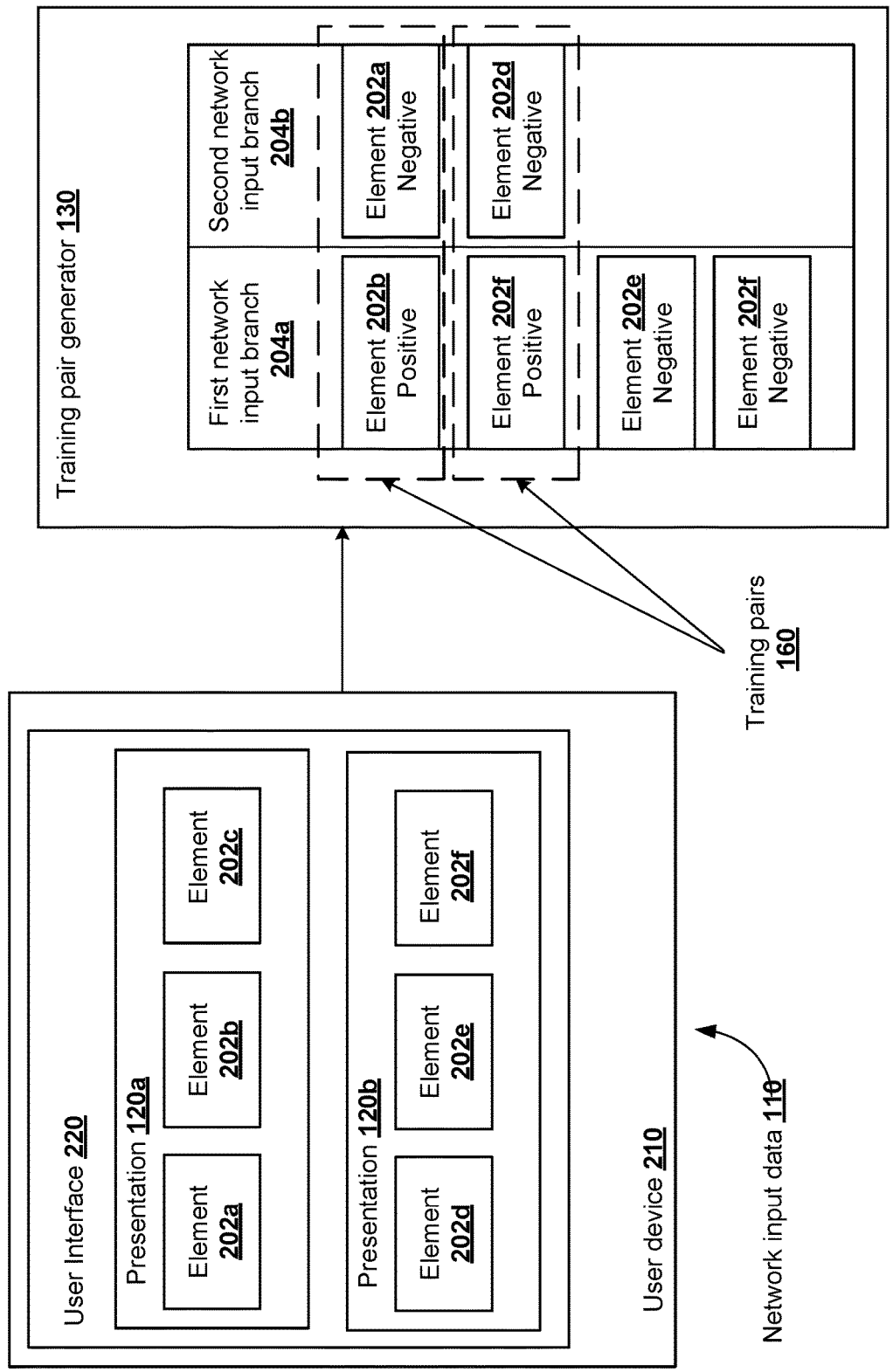
FIG. 2 illustrates an example process of generating training pairs from network input data for the pairwise ranking system.

FIG. 2 illustrates an example process of generating training pairs from network input data 110 for the pairwise ranking system 100.

As mentioned above, the training input data 110 includes one or more presentations 120, each presentation representing a list of elements 202 in an order. The elements 202 are also referred to as software applications in the following specification, for ease of explanation. That is, each presentation in the network input data 110 represent a plurality of software applications displayed on one or more pages of an application web store according to a respective order.

The software applications 202 that are represented by the network input data 110 are displayed in the user interface 220 of a user device 210 at the same time. The network input data 110 can include one or more presentations each having a plurality of elements positioned according to a respective pre-determined order. The user interface 220 can display the one or more presentations on a single page or multiple pages of a web store. For example, the user interface 210 (i.e., a smartphone, or a tablet) can display two presentations 120a and 120b of software applications 202 on the same page in an online application store. The user interface 220 can be configured to receive user input, e.g., by touch, gesture, or mouse-click, corresponding to a representation, e.g., an icon or text, of a software application.

The presentation 120 determines an order for applications 202 to be displayed in the user interface 220, e.g., left-to-right, or top-to-bottom, in the user interface 220. Applications 220 in a higher position appear before applications at a lower position in the presentation order. For example, the application 202a appears before the application 202c in a first presentation 120a. As another example, the application 202e appears before the application 202f in a second presentation 120b. The presentation order can be an initial ranking for the displayed applications, e.g., by predicted relevance to a user.

To train the neural network, the ranking system 100 generates training data that includes a plurality of training pairs 160. In some implementations, a training pair generator 130 of the system 100 can generate training pairs 160 from the network input data 110. Each training pair includes a pair of respective training network inputs (i.e., elements 202), each with a positive or negative label. For example, as shown in FIG. 2, a first training pair 160 includes elements 202a and 202b, and a second training pair 160 includes elements 202f and 202d.

The ranking system 100 can instruct the training pair generator 130 to label training network inputs according to features of respective software applications 202 represented by the inputs 110, e.g., whether or not the application was selected by a user or installed by a user.

For example, the ranking system 100 assigns a positive label to an input when its respective application is selected by a user, and a negative label when the application is not selected. Other features can be used to determine whether to assign a positive or negative label to the input, including time spent by a user using a respective application, whether the respective application was used more than a threshold number of times by the user, whether the respective application, while displayed, was selected by the user, or a measure of quality of the respective application according to some metric.

Specifically, the ranking system 100 obtains: data indicating that a first training network input of the plurality of training network inputs has a positive label, and data for a second training network input of the plurality of training networks (i) that has a negative label and (ii) is higher than the first training network input in the presentation order. That is, the ranking system 100 only pairs a positively-labeled training network input into a training pair with a negatively-labeled training network input that is positioned before the positively-labeled training network in the presentation order.

For example, the ranking system 100 generates a training pair 160, from a plurality of training network inputs, that includes the first training network input 202b and the second training network input 202a. The plurality of training network inputs includes (i) a first application corresponding to the first training network input 202b that is selected for installation by a user while the application was displayed in a user interface (thus being positively labeled), and (ii) a second application corresponding to the second training network input 202a that was displayed immediately before the first application in the user interface, but was not selected for installation (thus being negatively labeled), then the ranking system 100 can generate a training pair 160 from the first and second training network inputs 202b, 202a.

As another example shown in FIG. 2, the first training network input (i.e., the third element 202f application presented in the presentation 120b) is paired with the second training network input (i.e., the first element 202d presented in the same presentation). The first element 202d has a higher position and appears before the third element 202f, however, the user chose the third element 202f instead of the first element 202d. Thus, the system 100 assigns a negative label to the first element 202d and a positive label to the third element 202f, and pairs the first element 202d and the third element 202f as a training pair 160.

The system 100 can assign each training network input under a first network input branch 204a or a second network branch 204b according to the input position and label. In some implementations, the system 100 assigns the positively labeled elements in a presentation under the first network input branch 204a, and the negatively labeled elements under the second network input branch 204b. For example, the system 100 assigns the first element 202a under the second network input branch 204b, and assigns the second element 202b under the first network input branch 204a. The elements listed under the first network input branch can be used for obtaining pointwise losses when training the neural network 140.

In some implementations, the ranking system 100 generates multiple training pairs, where each training pair includes the same positively labeled training network input, but different training network inputs representing elements 202 appearing before the element represented by the positively labeled training network input, in the presentation order. For example, when the elements 202 are software applications, the positively labeled network input can represent a software application presented in a user interface 220 that was installed or selected by a user, and the negatively labeled training network inputs can represent software applications appearing before the selected/installed software application, but that were not installed or selected by the user.

Figure 3:
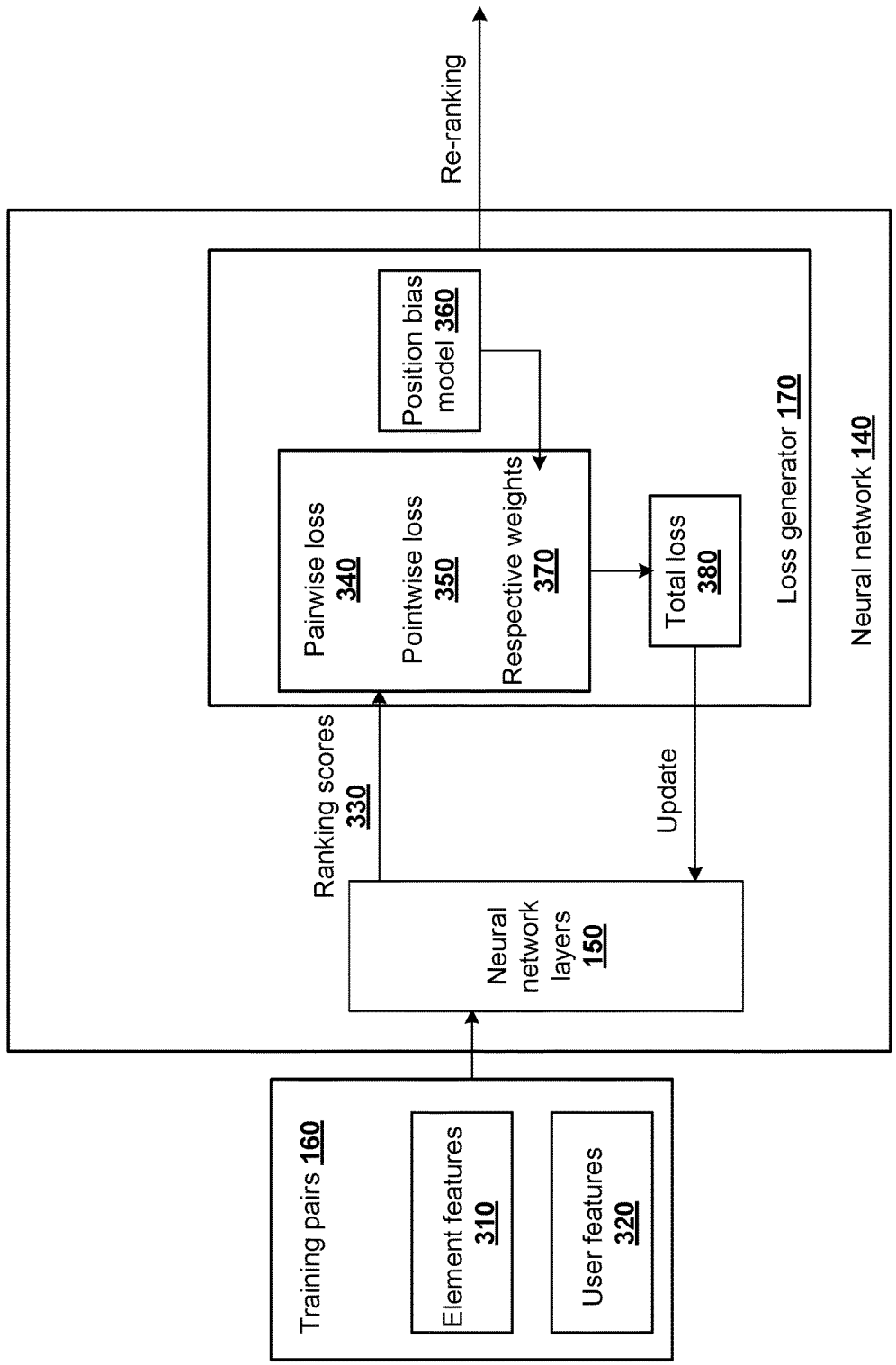
FIG. 3 illustrates an example neural network that is trained using a weighted pairwise loss.

FIG. 3 illustrates an example neural network 140 that is trained using a weighted pairwise loss.

After generating the training pairs, the ranking system 100 can train the neural network 140 on the training data. As shown in FIG. 3, the system 100 provides training pairs 160 to the neural network 140. The training pairs 160 include a plurality of network input pairs, with each network input in each pair having features 160 such as element features 310 and user features 320. Specifically, the element features 310 can include data representing the contents, rating scores, and prices for each element in each pair. The element features can be label information for a given element of a pair (i.e., assigned with a positive label or negative label). The user features 320 can include information characterizing the user, e.g., information about the location of the user's device, and the current time zone in the location of the user's device, and historical data representing the average time that the user has spent on browsing elements of a presentation, and a probability that, based on historical data of the user, the user would interact with the one or more elements (i.e., whether the user would check content details of the element, or purchase the element) during the presentation.

The system 100 provides the training pairs 160 into the neural network 140 with a plurality of neural network layers 150 having initial network parameters. The ranking system 100 then processes the first training network input 204a through the neural network 140 to generate a first ranking score. The ranking system processes the second training network input 204b through the neural network 140 to generate a second ranking score. Then, the ranking system 100 generates a first loss for the first training network input 204a according to an objective function that measures an error between (i) a label for a network input and (ii) a ranking score generated for the network input. The first loss is also referred to as a pointwise loss 350, as it is based on each first training network input. For example, the pointwise loss 350 can be a cross-entropy loss.

The ranking system 100 also generates a pairwise loss 340 for the training pair that includes the first and second training network inputs 204a and 204b based on a difference between the first ranking score and the second ranking score. The difference can be computed as a distance function of the values of the labels of the paired network inputs. The distance function can take, as input, predicted probabilities for positions of the training network inputs, as well as the labels for the network inputs in the pair. Equation 1, below is an example of a function for computing a pairwise loss between two network inputs:

Loss(p1,p2,label1,label2):=I(label1==1)*max(0,p2−p1+D)+I(label2==1)*max(0,p1−p2+D)     EQUATION 1

Where:
p1 and p2 correspond to the output probabilities for the first network input and the second network input, respectively;
D is a hyper-parameter value that defines a minimum distance between the output of a positively labeled training network input and a negatively labeled training network input. Hence, the margin D should be in the interval [0, T], where T corresponds to the range of the neural network's output, e.g., between 0 and 1; and
I(label i) is an indicator function for element i being positively labeled.

The pairwise loss is defined as above to ensure that the ranking score of an application that was installed by the user should be greater than that of another application that was not installed. The margin D in the pairwise loss serves as a buffer to distinguish the ranking scores between positively labeled inputs and negatively labeled inputs.

The ranking system 100 updates the network parameter values for the neural network 140 using the pairwise loss 340 and the first loss. The ranking system can use any conventional technique for updating the parameter values, e.g., backpropagation using gradient descent. In some implementations, the ranking system 100 generates a second loss for the second training network input 204b and additionally updates the network parameter values using the second loss. In some implementations, the second loss is also referred to as a pointwise loss.

As part of training, the ranking system 100 can use a position bias model 360 to provide respective weights 370 for both the pairwise loss 340 and pointwise loss 350.

The respective weights 370 depend on the respective positions of positively-labeled elements in the training pair in the presentation order. For example, the ranking system 100 can apply smaller weights to positively-labeled inputs positioned higher in the presentation order, and larger weights to positively-labeled inputs positioned lower in the presentation order. As another example, the positively-labeled element 202b has a higher position than element 202c in the presentation 120a, thus the weight generated for the element 202b is smaller than that of element 202c if the element 202c also has a positive label. By applying weights according to element positions for positively labeled elements, the ranking system 100 can correct a position bias introduced when positively labeled network inputs higher in the presentation order are favored over positively labeled network inputs lower in the presentation order. In other words, the system 100 considers the network inputs positioned in a higher position normally have a higher installation/selection rate at least partially due to the position advantages.

After generating the respective weights 370, the loss generator 170 generates a total loss 380 from the pairwise loss 340 and the pointwise loss 350 weighted by respective weights 370. Then the ranking system 100 trains the neural network 140 by minimizing the provided total loss 380 and updating the parameters for each layer of the neural network layers 150. After the ranking system 100 trains the neural network 140, the ranking system can output ranking scores for re-ranking the elements, i.e., ranking elements according to ranking scores representing the updated positions for each element in a presentation order.

Figure 4:
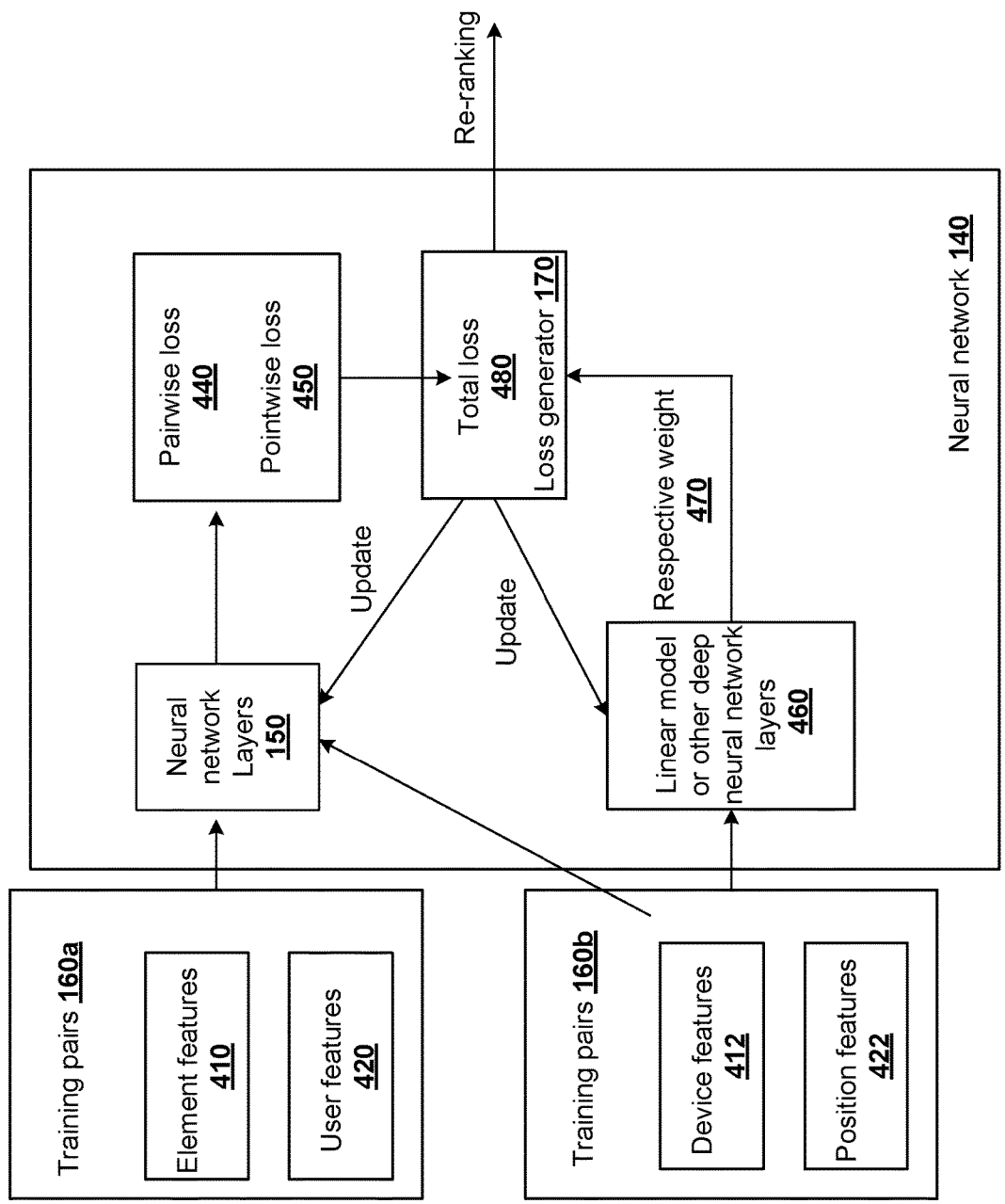
FIG. 4 illustrates another example neural network that uses a weighted pairwise loss.

FIG. 4 illustrates another example neural network that uses a weighted pairwise loss.

As shown in FIG. 4, the deep neural network 140 can further incorporate with a linear model or other deep neural network layers 460 to generate respective weights 470. Besides the training pairs 160a representing element features 410 and user features 420, the system 100 can provide the neural network 140 as input training pairs 160b representing device features 412 and position features 422, e.g., software applications in a presentation order in a user interface. The neural network layers 150 takes as input element features 410, user features 420, and device features 412 and defines pairwise loss 440 and pointwise loss 450. The linear model or other deep neural network layers 460 receives as input device features 412 and position features 422 to obtain respective bias weights 470. Then the loss generator 170 can generate a total loss 480 based on the input bias weights 470 for training both neural network layers 150 and 460. The system can train the neural network 140 using any conventional methods that aim at decreasing the total loss 480 and updating network parameters for each nodes of each neural network layer 150.

Similarly to FIG. 3, the generated weights for the training pairs 140b favor higher quality network inputs (i.e., measured as having a higher quality by the ranking system 100 if the network inputs have a higher selection/installation rate) but positioned lower in the presentation order, e.g., software applications of a lower position in the presentation order are favored to re-rank higher over software applications of a higher position but having the same measure of quality.

The ranking system 100 can train the neural network 140 on training data, including training pairs generated by the techniques described above. In some implementations, the ranking system trains the neural network on training data that includes training pairs not generated by the ranking system.

In some implementations, the trained position bias model 350 can be implemented as part of the neural network being trained, and receive device, user, and position features in tandem with the neural network. Before the loss is computed, the weights can be applied to the training network inputs.

In some implementations, the neural network is configured to receive a slate of network inputs. The network inputs in the slate are ordered according to a ranking order. The neural network is configured to (i) receive as input a plurality of network inputs ordered according to a ranking, and (ii) generate, as output, respective ranking scores for re-ranking the plurality of network inputs.

The above description describes training the neural network when the neural network is configured to perform a single ranking task, i.e., generate a single ranking score for a given network input that is a prediction of how the network input should be ranked according to one set of criteria.

In some cases, however, the neural network is a multi-task neural network that is configured to perform multiple ranking tasks. In other words, the neural network is configured to generate, for a given network input, multiple different ranking scores, each of which corresponds to a different set of criteria.

For example, when the network inputs represent software applications, one ranking score might be a ranking score when ranking the network inputs according to an engagement rate metric that measures a likelihood that the user will engage with a listing representing the software application in a user interface, another ranking score might be a ranking score when ranking the network inputs according to an install rate metric that measures the likelihood that the user will install the software application on the user device, and another ranking score might be a ranking score when ranking the network inputs according to yet another metric that measures a different aspect of user engagement with the software application.

Figure 5:
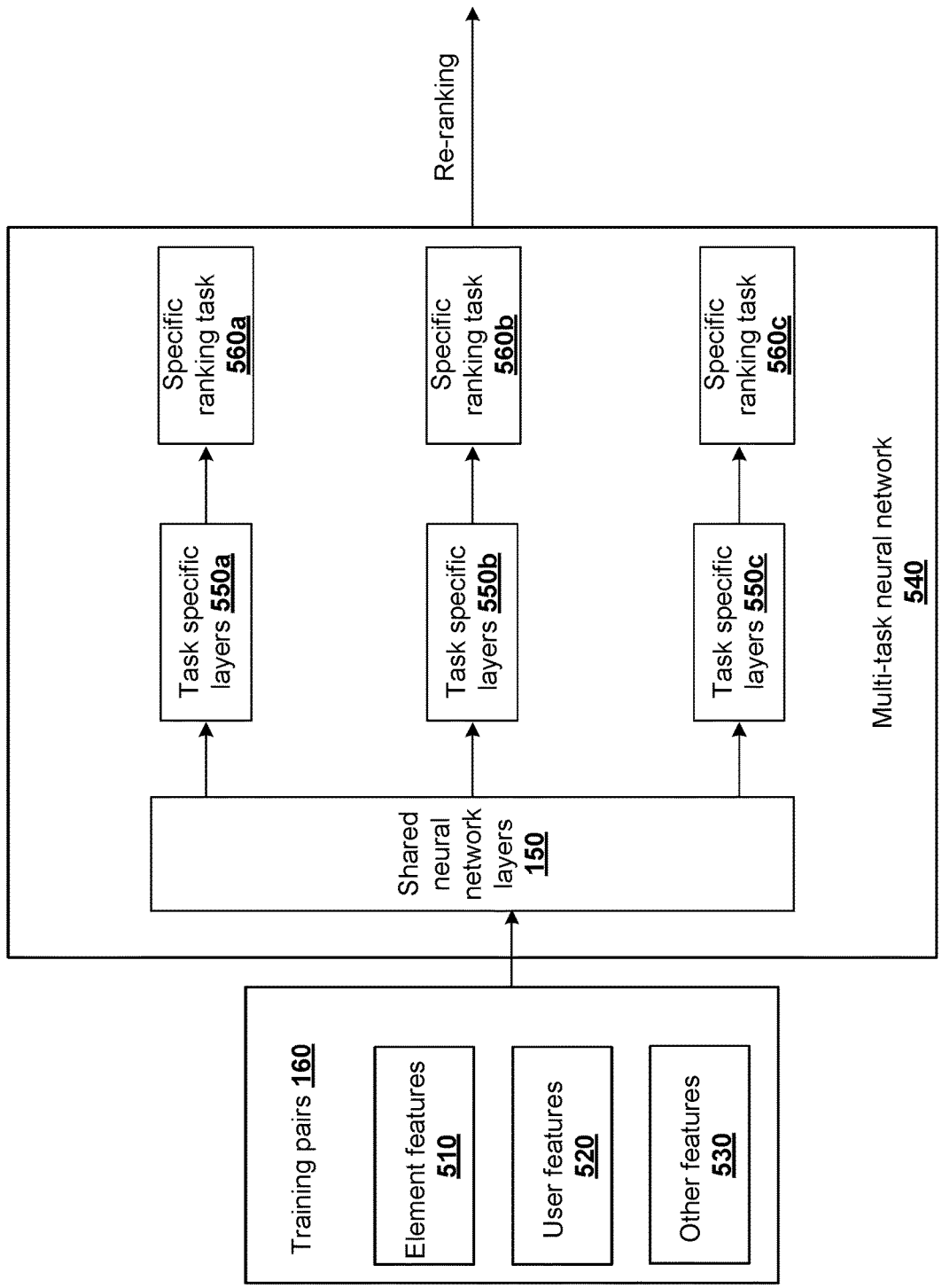
FIG. 5 illustrates an example pairwise ranking system having a multi-task neural network.

FIG. 5 illustrates an example pairwise ranking system 100 having a multi-task neural network 540.

The ranking system 100 provides training pairs 160 to the multi-task neural network 540. The multi-task neural network 540 includes one or more layers 150 that are shared between all of the multiple tasks and a respective set of task specific layers 550 for each of the multiple tasks. For example, the shared layers 150 can receive the network inputs as training pairs 160 representing element features 510, user features 520, and other features 530, and generate an intermediate representation of each network input through the shared one or more layers 150. The ranking system 100 provides the intermediate representation to the respective sets of task-specific layers, i.e., 550a, 550b, and 500c to generate the ranking score for the corresponding task.

For example, as shown in FIG. 5, the task specific layer 550a can generate a ranking score for the network input regarding a specific ranking task 560a. For another example, the task specific layer 550c can generate another ranking score for the same network input regarding another ranking task 560c. In general, the ranking system 100 obtains different ranking scores for each network input through the multi-task neural network 540 because specific ranking tasks for the same network input can have different ranking criteria, as explained above.

In some implementations, the system trains the multi-task neural network 540 jointly on all of the multiple tasks by performing the techniques described above for each of the multiple tasks 560 during the training. In other words, the training system 100 can separately generate training data (i.e., training features 560) for each of the multiple tasks 560 as described above, i.e., generate training pairs separately for each task based on positive and negative labels that are determined based on the criteria corresponding to the task, and then train the multi-task neural network 540 on the combined training data for all of the multiple tasks. When training on a training pair for a given one of the tasks, the system applies the updates to the parameters of the task-specific layers for the given task and the parameters of the shared layers 150 that are shared between all of the tasks. Thus, the parameters for the shared layers 150 are updated using the combined training data for all of the tasks while the task-specific layer parameters 550 are only updated using the training pairs in the combined training data that were generated for the corresponding task 560.

Figure 6:
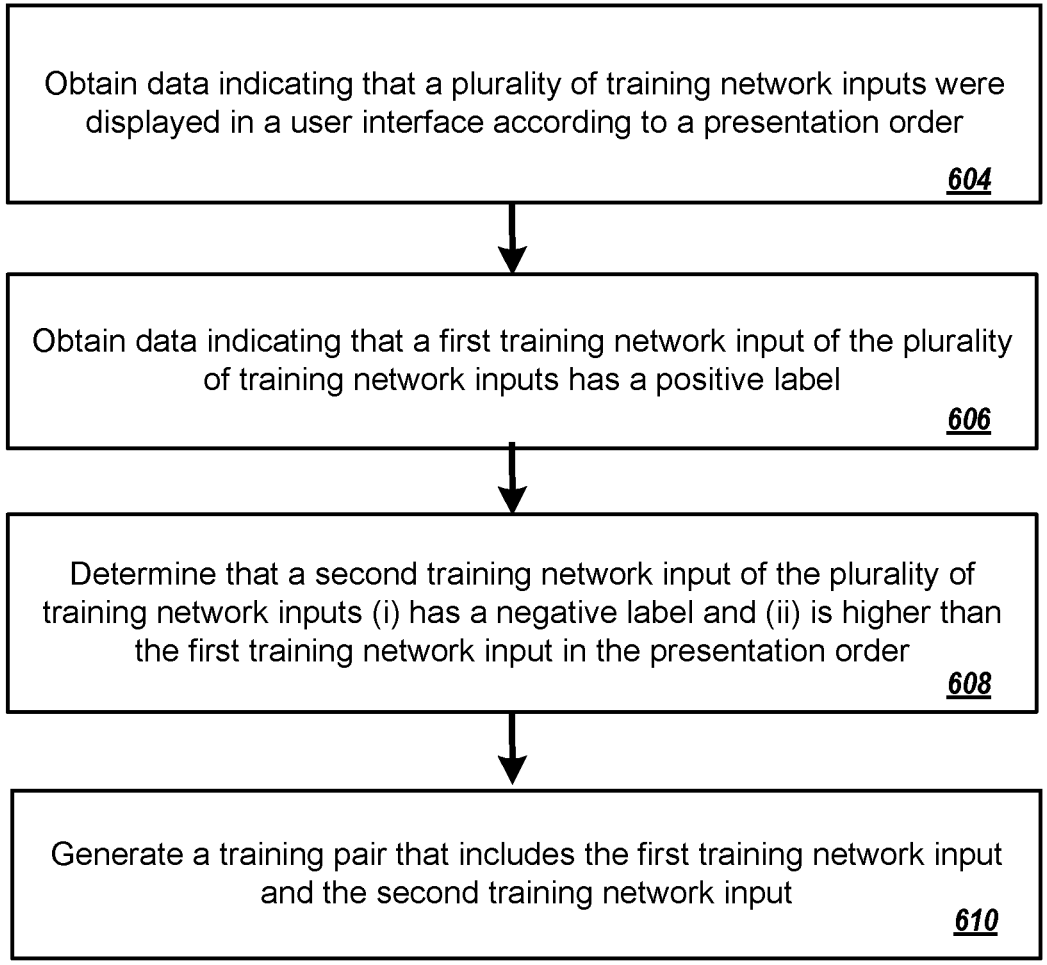
FIG. 6 illustrates an example process of generating training data for training the neural network.

FIG. 6 illustrates an example process 600 of generating training data for training the neural network 140 or 540. For convenience, the process 600 will be described as being performed by a system of one or more computers located in one or more locations. For example, a pairwise ranking system, e.g., the ranking system 100 of FIG. 1, appropriately programmed, can perform the process 600.

To generate training data, i.e., training pairs or training features as described above, the ranking system 100 first obtains data indicating that a plurality of training network inputs were displayed in a user interface according to a presentation order (604). The training network inputs can be elements such as software applications presented to the user in an online store following an initially determined order. The initially determined order can be obtained through historical data that presents the popularity or quality of each software application.

Depending on whether a user interacts or installs a listed element from a presentation, the system 100 obtains data indicating the element, or a first training network input, of the plurality of training network inputs has a positive label (606).

The system 100 then chooses a second element, or a second training network input, of the plurality of training network inputs, and determines if the second element has a negative label and has a higher position than the first element in the presentation order (608).

The system 100 generates a training pair that includes both the first and second labeled elements in the presentation (610). The system provides each training pair to train neural network 140 or 540 for re-ranking a plurality of elements in a presentation. As described earlier, the system 100 can assign the positively labeled input of a training pair under the first network input branch 204a, while the negatively labeled input of the training pair under the second network input branch 204b.

Figure 7:
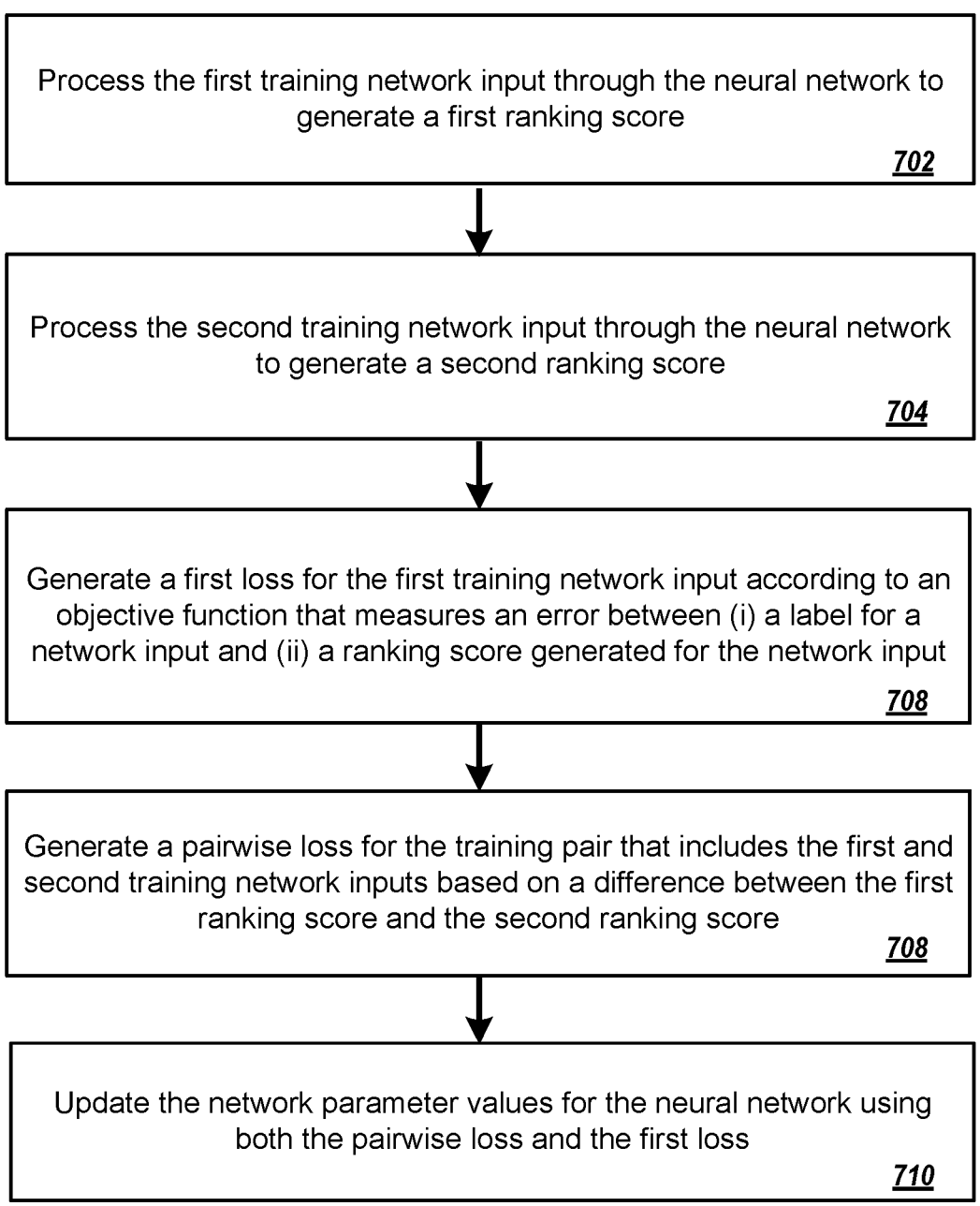
FIG. 7 illustrates an example process of training the neural network based on the training data.

FIG. 7 illustrates an example process 700 of training the neural network 140 or 540 based on the training data. For convenience, the process 700 will be described as being performed by a system of one or more computers located in one or more locations. For example, a pairwise ranking system, e.g., the ranking system 100 of FIG. 1, appropriately programmed, can perform the process 700.

To train the neural network on the training data, the system 100 first provides the first training network input through the neural network to generate a first ranking score (702). The first training network includes training features that characterized the first element in the presentation, such as element features, user features, device features, and position features. Similarly, the system generates a second ranking score by providing the neural network the second training network input (704).

The system 100 then generates a first loss for the first training network input according to an objective function, wherein the objective function measures an error between a label for a network input and a ranking score generated for the network input (706). The first loss can also be referred to as pointwise loss, for example, a cross-entropy loss.

The system 100 also generates a pairwise loss for the training pair of the first and second network input from a difference between the first ranking score and the second ranking score (708).

Finally, the system 100 trains the neural network by updating the network parameter values using both the first loss and the pairwise loss (710). In some implementations, the system 100 generates respective weights for each of the training pair to combine the first loss and the pairwise loss for training the neural network.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on one or more computers having, or configured to communicate with, a display device, e.g., a LCD (liquid crystal display) or organic light-emitting diode (OLED) monitor, a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a neural network, wherein the neural network has network parameter values and is used to generate a ranking score for a network input, and
    wherein the method comprises:
    generating training data for training the neural network, wherein the training data includes a plurality of training pairs, each training pair comprising a respective training network input with a positive label and a respective training network input with a negative label, the generating comprising:
        obtaining data indicating that a plurality of training network inputs were displayed in a user interface according to a presentation order,
        obtaining data indicating that a first training network input of the plurality of training network inputs has a positive label, wherein the positive label is based on a user interacting with the first training network input when the training network inputs were displayed in a user interface according to the presentation order,
        determining that a second training network input of the plurality of training network inputs (i) has a negative label and (ii) was positioned before the first training network input in the presentation order when the plurality of training network inputs were displayed in the user interface, wherein the negative label is based on the user not interacting with the second training network input when the training network inputs were displayed in a user interface according to the presentation order, and
        based on determining that the second training network input (i) has a negative label and (ii) was positioned before the first training network input in the presentation order, generating a training pair that includes the first training network input and the second training network input; and training the neural network on the training data, the training comprising:
processing the first training network input through the neural network to generate a first ranking score;
processing the second training network input through the neural network to generate a second ranking score;
generating a pairwise loss for the training pair that includes the first and second training network inputs based on a difference between the first ranking score generated by the neural network for the first training network input and the second ranking score generated by the neural network for the second training network input; and
updating the network parameter values for the neural network using the pairwise loss.

2. The method of claim 1, wherein training the neural network on the training data further comprises:
generating a first loss for the first training network input according to an objective function that measures an error between (i) a label for a network input and (ii) the first ranking score generated for the network input; wherein
updating the network parameter values for the neural network comprises updating the network parameters using both the pairwise loss and the first loss.

3. The method of claim 2, further comprising:
generating a second loss for the second training network input; and
updating the network parameter values for the neural network using the second loss.

4. The method of claim 2, wherein generating the first loss for the first training network input comprises applying a respective weight to the first training network input according to a position of the first training network input in the presentation order.

5. The method of claim 4, wherein generating the first loss for the first training network input comprises:
processing the first training network input through a trained position bias model to generate the respective weight,
wherein the trained position bias model is trained to generate weights for network inputs using respective positions of training network inputs according to a respective presentation order.

6. The method of claim 1, wherein the plurality of network training inputs comprises:
a third training network input having a positive label, and one or more fourth training network inputs having negative labels; and
wherein generating the plurality of training pairs comprises generating, for each of the one or more fourth training network inputs, a respective pair of training network inputs comprising the fourth training network input and the first training network input.

7. The method of claim 1, wherein the method further comprises, after training the neural network on the training data:
obtaining a plurality of network inputs,
processing each of the plurality of network inputs through the neural network to generate a respective ranking score; and
ranking the plurality of network inputs according to the respective ranking scores.

8. The method of claim 7, wherein obtaining the plurality of network inputs comprises obtaining the plurality of network inputs using a trained candidate generation model trained to obtain the plurality of network inputs from a collection of network inputs based on a respective predicted relevance of each network input in the plurality of network inputs.

9. The method of claim 1, wherein the plurality of training network inputs represent software applications displayed on one or more pages of an application web store.

10. The method of claim 9, wherein obtaining the data indicating that the first training network input of the plurality of training network inputs has the positive label comprises assigning the positive label to the first training network input based on whether or not the user interacts with a software application represented by the first training network input by viewing or selecting the software application.

11. The method of claim 9, wherein the network input for the neural network comprises one or more features for a respective software application, and wherein the one or more features comprise one or more of:
time spent by a user using a respective application,
whether the respective application was used more than a threshold number of times by the user,
whether the respective application, while displayed, was selected by the user, or
a measure of quality of the respective application.

12. The method of claim 1, wherein the neural network is a slate neural network configured to (i) receive as input a plurality of network inputs ordered according to a ranking, and (ii) generate, as output, respective ranking scores for re-ranking the plurality of network inputs.

13. The method of claim 1, wherein the training data is training data for a first ranking task, wherein the neural network is a multi-task neural network configured to perform a plurality of ranking tasks including the first ranking task, and wherein the method further comprises:
training the neural network on respective training data for each of one or more other tasks in the plurality of ranking tasks.

14. A system comprising one or more computers and one or more storage devices on which are stored instructions that are operable, when executed by the one or more computers, to cause the one or more computers to perform operations comprising training a neural network, wherein the neural network has network parameter values and is used to generate a ranking score for a network input, and
wherein the training comprises:
generating training data for training the neural network, wherein the training data includes a plurality of training pairs, each training pair comprising a respective training network input with a positive label and a respective training network input with a negative label, the generating comprising:
obtaining data indicating that a plurality of training network inputs were displayed in a user interface according to a presentation order,
obtaining data indicating that a first training network input of the plurality of training network inputs has a positive label, wherein the positive label is based on a user interacting with the first training network input when the training network inputs were displayed in a user interface according to the presentation order,
determining that a second training network input of the plurality of training network inputs (i) has a negative label and (ii) was positioned before the first training network input in the presentation order when the plurality of training network inputs were displayed in the user interface, wherein the negative label is based on the user not interacting with the second training network input when the training network inputs were displayed in a user interface according to the presentation order, and based on determining that the second training network input (i) has a negative label and (ii) was positioned before the first training network input in the presentation order, generating a training pair that includes the first training network input and the second training network input; and training the neural network on the training data, the training comprising:

processing the first training network input through the neural network to generate a first ranking score;

processing the second training network input through the neural network to generate a second ranking score;

generating a pairwise loss for the training pair that includes the first and second network inputs based on a difference between a first ranking score generated by the neural network for the first training network input and a second ranking score generated by the neural network for the second training network input; and updating the network parameter values for the neural network using the pairwise loss.

15. The system of claim 14, wherein training the neural network on the training data further comprises:

generating a first loss for the first training network input according to an objective function that measures an error between (i) a label for a network input and (ii) a ranking score generated for the network input;

wherein updating the network parameter values for the neural network comprises updating the network parameters using both the pairwise loss and the first loss.

16. The system of claim 15, the operations further comprising:

generating a second loss for the second training network input; and updating the network parameter values for the neural network using the second loss.

17. One or more non-transitory computer storage media encoded with instructions that, when executed by one or more computers, cause the one or more computers to perform operations comprising training a neural network, wherein the neural network has network parameter values and is used to generate a ranking score for a network input, and wherein the training comprises:

generating training data for training the neural network, wherein the training data includes a plurality of training pairs, each training pair comprising a respective training network input with a positive label and a respective training network input with a negative label, the generating comprising:

obtaining data indicating that a plurality of training network inputs were displayed in a user interface according to a presentation order, obtaining data indicating that a first training network input of the plurality of training network inputs has a positive label, wherein the positive label is based on a user interacting with the first training network input when the training network inputs were displayed in a user interface according to the presentation order, determining that a second training network input of the plurality of training network inputs (i) has a negative label and (ii) was positioned before the first training network input in the presentation order when the plurality of training network inputs were displayed in the user interface, wherein the negative label is based on the user not interacting with the second training network input when the training network inputs were displayed in a user interface according to the presentation order, and based on determining that the second training network input (i) has a negative label and (ii) was positioned before the first training network input in the presentation order, generating a training pair that includes the first training network input and the second training network input; and training the neural network on the training data, the training comprising:

processing the first training network input through the neural network to generate a first ranking score;

processing the second training network input through the neural network to generate a second ranking score;

generating a pairwise loss for the training pair that includes the first and second network inputs based on a difference between a first ranking score generated by the neural network for the first training network input and a second ranking score generated by the neural network for the second training network input; and updating the network parameter values for the neural network using the pairwise loss.

18. The one or more non-transitory computer storage media of claim 17, wherein training the neural network on the training data further comprises:

generating a first loss for the first training network input according to an objective function that measures an error between (i) a label for a network input and (ii) a ranking score generated for the network input;

wherein updating the network parameter values for the neural network comprises updating the network parameters using both the pairwise loss and the first loss.

19. The one or more non-transitory computer storage media of claim 18, the operations further comprising:

generating a second loss for the second training network input; and updating the network parameter values for the neural network using the second loss.

20. The system of claim 14, wherein generating the first loss for the first training network input comprises applying a respective weight to the first training network input according to a position of the first training network input in the presentation order.

* * * * *